W. F. COCHRANE.
Harvester Rake.

No. 50,066. Patented Sept. 19, 1865.

Witnesses:
J. J. Poyton.
O. Hale.

Inventor:
Wm. F. Cochrane
by his Attys:
Baldwin & Son.

UNITED STATES PATENT OFFICE.

WILLIAM F. COCHRANE, OF SPRINGFIELD, OHIO, ASSIGNOR TO HIMSELF, B. F. WARDER, AND J. C. CHILD, OF SAME PLACE.

IMPROVEMENT IN HARVESTER-RAKES.

Specification forming part of Letters Patent No. 50,066, dated September 19, 1865.

*To all whom it may concern:*

Be it known that I, WILLIAM F. COCHRANE, of Springfield, in the county of Clarke and State of Ohio, have invented a new and useful Improvement in Harvester-Rakes, of which the following is a full, clear, and exact description, reference being had to the accompanying drawings, which make part of this specification, and in which—

Figure 1:
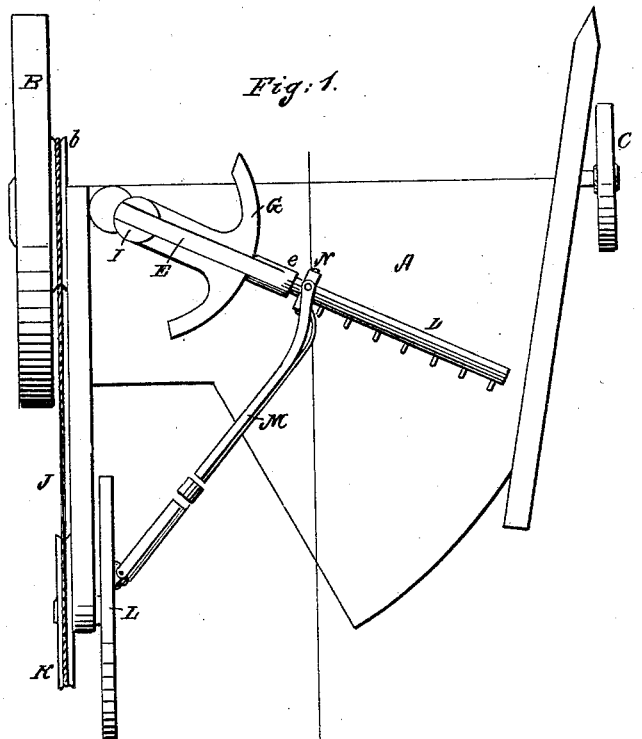
Figure 2:
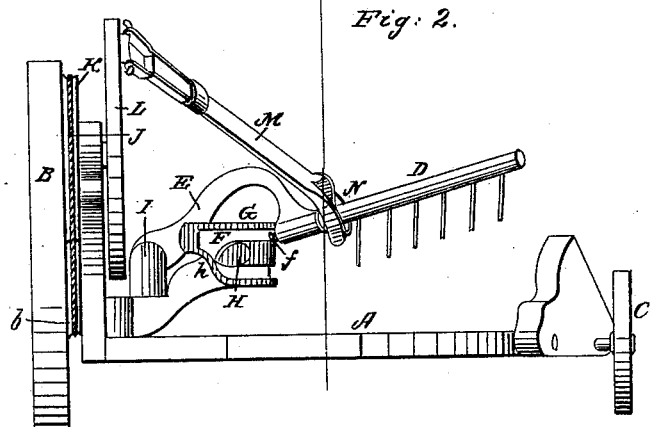
Figure 3:
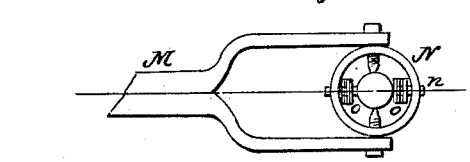

Figure 1 represents a plan or top view of a harvester embracing my improvement. Fig. 2 represents a view in elevation of the same as seen from the rear, and Fig. 3 an enlarged view of the device for connecting the rake-head and pitman.

It is the object of my invention automatically to discharge the cut grain from the platform of a harvester by drawing it off endwise in the arc of a circle and depositing it upon the ground out of the way of the team in cutting the next swath; and to this end my improvement consists, first, in mounting the rake in an arched or "goose-necked" arm moving vertically in a turning post, and controlled by a guide-slot provided with a latch to prevent the backward movement of the rake; secondly, in driving a goose-necked vibrating sweep-rake by a pitman swiveled to a wheel or crank-arm located back of the driving-wheel and platform, as hereinafter described; thirdly, in a device for varying the range of motion of the rake, or adapting it to work at different heights of cut, without lengthening or shortening the pitman.

In the accompanying drawings, which exemplify one mode of carrying out the objects of my invention, a platform, A, is shown as supported upon two wheels, B C.

The rake-head D is inserted into a socket, e, in a goose-neck, E, its inner end, f, projecting through the socket and traveling in a slot, F, in the inner fence, G. A suitable latch, H, in the rear of the slot lifts to allow the rake-guide to pass up through it, but prevents its return. The inner end of the goose-neck E is pivoted to play vertically in a turning-post, I, on the main frame or platform.

A band, J, encircling a pulley, b, on the driving-axle and a corresponding one, K, on the crank-axle, drives a crank-arm or wheel, L, to which one end of the pitman M is swiveled. This crank-arm is mounted on a frame in rear of the driving-wheel and above the platform. The front end of the pitman is forked to embrace a ring, N, to which it is pivoted by vertical pivots. A horizontal pin, n, passes through this ring and through the rake-head. A series of washers, o, keep the rake-head from rattling or sliding in the ring, and by changing them from one side to the other the range of motion of the rake may be varied—that is, it may be caused to strike the platform farther backward or forward as may be required; or this device may be used to adjust the rake to different heights of cut.

The machine is to be provided with a tongue, reel, divider, driver's seat, gearing, and cutting apparatus, all of which may be constructed in any well-known way.

It will readily be perceived that by my invention I am enabled to drive the rake by a band or cord directly from the driving-axle, and to arrange the raking mechanism on the gearing side of the machine behind the driving-wheel and far enough above the platform to be out of the way of the grain as it falls upon or is discharged from the platform.

The operation is as follows: In the drawings the rake is shown as elevated and moving forward. As the machine progresses the rake advances (its direction being controlled by the guide $f$ moving in the slot F) until it reaches the end of the forward stroke, when it drops suddenly upon the grain and commences to draw it off. The guide returns through the lower part of the guide-slot, holding the rake down until the gavel is discharged, when it ascends the incline $h$ and lifts the latch H, in order to pass into the upper part of the slot, and recommences its forward movement. As soon as the rake has passed, the latch falls and prevents its backward movement.

A spring may, if desired, be secured upon the turning-post so as to bear upon the back of the goose-neck, to throw the rake-teeth down upon the platform more forcibly than if they fell only with the force of the gravity of the rake, and to hold the teeth down positively.

By using an arched rake-arm I am enabled to pivot it inside the inner fence, and thus to obtain a longer sweep for the rake and to locate my guide-slot in the inner fence or guard, which results would be unattainable with a straight rake-arm.

It is obvious that my invention might readily be adapted to a two-wheeled or a hinged-joint machine.

What I claim as my invention, and desire to secure by Letters Patent of the United States, is—

1. The combination of the goose-neck or arched rake-arm, having both a vertical and a horizontal turning movement on its pivot, with the guide-slot and switch-latch, substantially in the manner and for the purposes described.

2. The combination of the guide-slot, the switch, and the goose-necked vibrating sweep-rake with the mechanism for driving said rake, when arranged and operating substantially as and for the purposes set forth.

3. The combination of the rake-head, swivel-ring, and adjusting-washers, arranged and operating as described.

In testimony whereof I have hereunto subscribed my name.

WM. F. COCHRANE.

Witnesses:
  EDM. F. BROWN,
  WM. D. BALDWIN.